(12) United States Patent
Iyer et al.

(10) Patent No.: US 7,883,207 B2
(45) Date of Patent: Feb. 8, 2011

(54) REFRACTIVE-DIFFRACTIVE MULTIFOCAL LENS

(75) Inventors: Venkatramani S. Iyer, Roanoke, VA (US); William Kokonaski, Gig Harbor, WA (US); Joshua N. Haddock, Roanoke, VA (US); Roger Clarke, Cambridge (GB); Ronald D. Blum, Roanoke, VA (US)

(73) Assignee: PixelOptics, Inc., Roanoke, VA (US)

( * ) Notice: Subject to any disclaimer, the term of this patent is extended or adjusted under 35 U.S.C. 154(b) by 60 days.

(21) Appl. No.: 12/270,116

(22) Filed: Nov. 13, 2008

(65) Prior Publication Data

US 2009/0153794 A1 Jun. 18, 2009

Related U.S. Application Data

(63) Continuation-in-part of application No. 12/059,908, filed on Mar. 31, 2008, which is a continuation-in-part of application No. 11/964,030, filed on Dec. 25, 2007, application No. 12/270,116, which is a continuation-in-part of application No. 12/238,932, filed on Sep. 26, 2008.

(60) Provisional application No. 61/013,822, filed on Dec. 14, 2007, provisional application No. 61/030,789, filed on Feb. 22, 2008, provisional application No. 61/038,811, filed on Mar. 24, 2008.

(51) Int. Cl.
*G02C 7/06* (2006.01)
*A61F 2/16* (2006.01)

(52) U.S. Cl. .................. 351/169; 351/161; 351/168; 623/6.27; 623/6.3

(58) Field of Classification Search ................ 351/169; 623/6.25, 6.3, 6.31
See application file for complete search history.

(56) References Cited

U.S. PATENT DOCUMENTS 2,437,642 A 3/1948 Henroleau (Continued)

FOREIGN PATENT DOCUMENTS

CN 89113088 10/2001
DE 4223395 1/1994

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.
Thibos, Larry N., et. al.; Vision through a liquid-crystal spatial light modulator; Adaptive Optics Conference; 1999; Durham, UK.
Miller, Donald T., et. al.; Requirements for Segmented Spatial Light Modulators For Diffraction-Limited Imaging Through Aberrated Eyes, Adaptive Optics Conference.

(Continued)

*Primary Examiner*—Jordan M. Schwartz
(74) *Attorney, Agent, or Firm*—Townsend and Townsend and Crew LLP

(57) ABSTRACT

Aspects of the present invention provide multifocal lenses having one or more multifocal inserts comprising one or more diffractive regions. A diffractive region of a multifocal insert of the present invention can provide a constant optical power or can provide a progression of optical power, or any combination thereof. A multifocal insert of the present invention can be fabricated from any type of material and can be inserted into any type of bulk lens material. A diffractive region of a multifocal insert of the present invention can be positioned to be in optical communication with one or more optical regions of a host lens to provide a combined desired optical power in one or more vision zones. Index matching layers of the present invention can be used to reduce reflection losses at interfaces of the host lens and multifocal insert.

20 Claims, 7 Drawing Sheets

U.S. PATENT DOCUMENTS

| | | |
|---|---|---|
| 2,576,581 A | 11/1951 | Edwards |
| 3,161,718 A | 12/1964 | De Luca |
| 3,245,315 A | 4/1966 | Marks et al. |
| 3,248,460 A | 4/1966 | Naujokas |
| 3,309,162 A | 3/1967 | Kosanke et al. |
| 3,614,215 A | 10/1971 | Mackta |
| 3,738,734 A | 6/1973 | Tait et al. |
| 3,791,719 A | 2/1974 | Kratzer et al. |
| 4,062,629 A | 12/1977 | Winthrop |
| 4,174,156 A | 11/1979 | Glorieux |
| 4,181,408 A | 1/1980 | Senders |
| 4,190,330 A | 2/1980 | Berreman |
| 4,190,621 A | 2/1980 | Greshes |
| 4,264,154 A | 4/1981 | Petersen |
| 4,279,474 A | 7/1981 | Belgorod |
| 4,300,818 A | 11/1981 | Schachar |
| 4,320,939 A | 3/1982 | Mueller |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,461,550 A | 7/1984 | Legendre |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A | 1/1989 | Okada et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,869,588 A | 9/1989 | Frieder et al. |
| 4,873,029 A | 10/1989 | Blum |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,048 A | 8/1990 | Frieder et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,147,585 A | 9/1992 | Blum |
| 5,150,234 A | 9/1992 | Takahashi et al. |
| 5,171,266 A | 12/1992 | Wiley et al. |
| 5,178,800 A | 1/1993 | Blum |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,512,371 A | 4/1996 | Gupta et al. |
| 5,522,323 A | 6/1996 | Richard |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,682,223 A | 10/1997 | Menezes et al. |
| 5,683,457 A | 11/1997 | Gupta et al. |
| RE35,691 E | 12/1997 | Theirl et al. |
| 5,702,819 A | 12/1997 | Gupta et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,859,685 A | 1/1999 | Gupta et al. |
| 5,861,934 A | 1/1999 | Blum et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |
| 6,095,651 A | 8/2000 | Williams et al. |
| 6,099,117 A | 8/2000 | Gregory |
| 6,115,177 A | 9/2000 | Vossler |
| 6,139,148 A | 10/2000 | Menezes |
| 6,145,987 A | 11/2000 | Baude et al. |

| | | |
|---|---|---|
| 6,188,525 B1 | 2/2001 | Silver |
| 6,191,881 B1 | 2/2001 | Tajima |
| 6,199,984 B1 | 3/2001 | Menezes |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,652,096 B1 | 11/2003 | Morris et al. |
| 6,682,195 B2 | 1/2004 | Dreher |
| 6,709,105 B2 | 3/2004 | Menezes |
| 6,709,107 B2 | 3/2004 | Jiang et al. |
| 6,709,108 B2 | 3/2004 | Levine et al. |
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,793,340 B1 | 9/2004 | Morris et al. |
| 6,833,938 B2 | 12/2004 | Nishioka |
| 6,840,619 B2 | 1/2005 | Dreher |
| 6,851,805 B2 | 2/2005 | Blum et al. |
| 6,859,333 B1 | 2/2005 | Ren et al. |
| 6,883,916 B2 | 4/2005 | Menezes |
| 6,886,938 B1 | 5/2005 | Menezes |
| 6,893,124 B1 | 5/2005 | Kurtin |
| 6,902,271 B2 | 6/2005 | Perrott et al. |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,085,065 B2 | 8/2006 | Silver |
| 7,133,172 B2 | 11/2006 | Nishioka |
| 7,159,981 B2 | 1/2007 | Kato |
| 7,159,983 B2 | 1/2007 | Menezes et al. |
| 7,209,097 B2 | 4/2007 | Suyama |
| 7,229,173 B2 | 6/2007 | Menezes et al. |
| 2001/0055094 A1 | 12/2001 | Zhang |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai |
| 2003/0210377 A1 | 11/2003 | Blum et al. |
| 2004/0008319 A1 | 1/2004 | Lai et al. |
| 2004/0046931 A1 | 3/2004 | Legerton et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |

| | | | |
|---|---|---|---|
| 2005/0073739 A1 | 4/2005 | Meredith | |
| 2005/0124983 A1 | 6/2005 | Frey et al. | |
| 2005/0152039 A1 | 7/2005 | Grier et al. | |
| 2006/0044510 A1 | 3/2006 | Williams et al. | |
| 2006/0126698 A1* | 6/2006 | Blum et al. | 372/101 |
| 2006/0164593 A1 | 7/2006 | Peyghambarian | |
| 2006/0170861 A1 | 8/2006 | Lindacher et al. | |
| 2007/0188700 A1 | 8/2007 | Piers et al. | |
| 2007/0216862 A1 | 9/2007 | Blum et al. | |
| 2008/0273167 A1* | 11/2008 | Clarke | 351/159 |
| 2008/0278681 A1* | 11/2008 | Blum et al. | 351/169 |
| 2009/0046349 A1* | 2/2009 | Haddock et al. | 359/319 |

FOREIGN PATENT DOCUMENTS

| | | |
|---|---|---|
| EP | 0154962 A2 | 9/1985 |
| EP | 0233104 A1 | 8/1987 |
| EP | 0237365 A1 | 9/1987 |
| EP | 0 578 833 A1 | 1/1994 |
| EP | 0578833 | 1/1994 |
| EP | 0649044 | 4/1995 |
| GB | 2170613 A | 8/1986 |
| GB | 2169417 A | 7/1987 |
| JP | 55-076323 | 6/1980 |
| JP | 61 156227 | 7/1986 |
| JP | 1 237610 | 9/1989 |
| JP | 05-100201 | 4/1993 |
| JP | 7-28002 A | 1/1995 |
| JP | 11352445 | 12/1998 |
| JP | 2007-323062 A | 12/2007 |
| WO | WO-92/01417 | 2/1992 |
| WO | WO 93/21010 | 10/1993 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

Thibos, Larry N., et. al.; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1, p. 1 only.

Naumov, A.F.; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome—The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

International Search Report for International Application No. PCT/US2008/86463, dated Feb. 9, 2009.

Electronic Spectacles for the 21$^{st}$ Century by Larry N. Thibos, Ph.D., and Donald T. Miller, Ph.D., Indiana Journal of Optometry, Spring 1999 vol. 2, No. 1 pp. 5-10.

Fowler et al., "Liquid crystal lens review", Ophthal. Physiol. Opt., 1990, vol. 10, pp. 186-194.

\* cited by examiner

REFRACTIVE-DIFFRACTIVE MULTIFOCAL LENS

CROSS-REFERENCE TO RELATED APPLICATIONS

This application is a continuation-in-part of U.S. patent application Ser. No. 12/059,908, filed on Mar. 31, 2008 which is a continuation-in-part of U.S. patent application Ser. No. 11/964,030, filed on Dec. 25, 2007.

This application is a continuation-in-part of U.S. patent application Ser. No. 12/238,932, filed on Sep. 26, 2008.

This application claims priority from and incorporates by reference in their entirety the following provisional applications:

U.S. Appl. No. 61/013,822, filed on Dec. 14, 2007;
U.S. Appl. No. 61/030,789, filed on Feb. 22, 2008; and
U.S. Appl. No. 61/038,811, filed on Mar. 24, 2008.

BACKGROUND OF THE INVENTION

1. Field of the Invention

The present invention generally relates to lenses. More specifically, the present invention provides an insert having a diffractive region that can be embedded into any host lens material to form a multifocal lens.

2. Background Art

There is a desire to improve the performance and cosmetic appeal of multifocal lenses. Traditional multifocal lenses, such as bifocal and trifocals, suffer from a number of disadvantages. As an example, many traditional multifocal lenses have a visible discontinuity separating each vision zone. Blended multifocals can reduce the visibility associated with these abrupt discontinuities but generally at the cost of rendering the blend zones optically unusable due to high levels of distortion and/or astigmatism. Traditional progressive lenses can provide multiple vision zones with invisible boundaries and no image breaks but these lenses typically have narrow vision zones and are associated with large amounts of unwanted astigmatism.

Diffractive optical structures have many advantages over refractive optical structures and can reduce the visibility of discontinuities between vision zones when used to construct multifocal lenses. However, lenses using diffractive optical structures to date have suffered from a number of compromises including severe chromatic aberration due to dispersion and ghosting due to poor diffraction efficiency.

Accordingly, what is needed is a multifocal lens that exploits the advantages of diffractive optical structures to provide less visible discontinuities while additionally reducing vision compromises commonly associated with diffractive optics.

BRIEF DESCRIPTION OF THE DRAWINGS/FIGURES

DETAILED DESCRIPTION OF THE INVENTION

Aspects of the present invention provide multifocal lenses having one or more multifocal inserts comprising one or more diffractive regions. A diffractive region of a multifocal insert of the present invention can provide a constant optical power or can provide a progression of optical power, or any combination thereof. A multifocal insert of the present invention can be fabricated from any type of material and can be inserted into any type of bulk lens material. A diffractive region of a multifocal insert of the present invention can be positioned to be in optical communication with one or more optical regions of a host lens to provide a combined desired optical power in one or more vision zones. Index matching layers of the present invention can be used to reduce reflection losses at interfaces of the host lens and multifocal insert.

A multifocal insert of the present invention can be applied to any type of optical lens or device including ophthalmic lenses such as, but not limited to, contact lenses, intra-ocular lenses, corneal in-lays, corneal on-lays, and spectacle lenses.

The multifocal lens of the present invention can be a finished lens (edged and ready to mount in a frame), a finished lens blank (not yet edged and ready to mount in a frame), a semi-finished lens blank (finished on at least one outer surface but not yet finished on a second outer surface) or a non-finished lens blank (having neither outer surface finished). Further, the present invention allows for any refractive or diffractive optical power including plano (i.e., no optical power).

Figure 1:
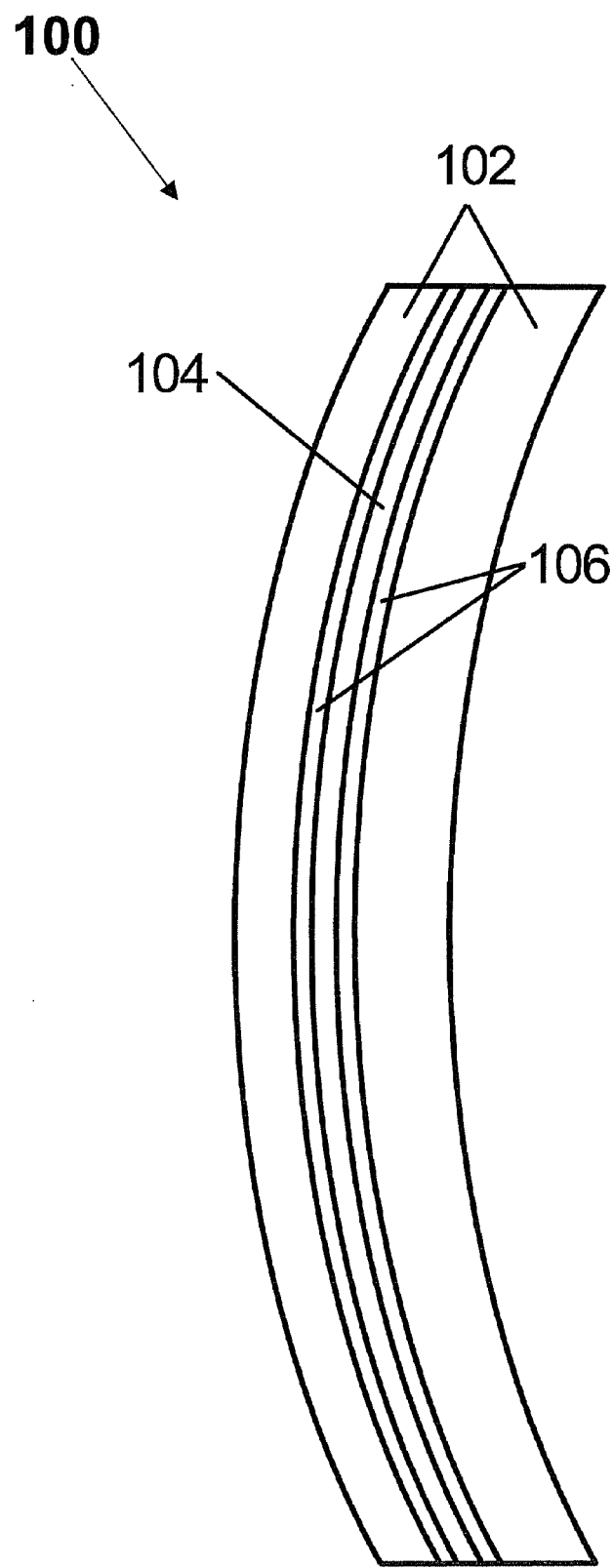
FIG. 1 illustrates a multifocal lens according to an aspect of the present invention.

FIG. 1 illustrates a multifocal lens 100 according to an aspect of the present invention. The multifocal lens 100 can comprise host lens material or layers 102 and an insert or internal layer 104. The host lens material 102 and the insert 104 can comprise different materials having different indices of refraction. The host lens material 102 and the insert 104 can comprise substantially homogeneous materials. The host lens material 102 can have an index of refraction that ranges, for example, from 1.30 to 2.0. The insert 104 can have a different index of refraction that also ranges, for example, from 1.30 to 2.0. The host lens material 102 can be considered to be bulk lens material.

The multifocal lens 100 can be a finished, non-finished, or semi-finished lens blank. The multifocal lens 100 can be a final ophthalmic lens. The multifocal lens 100 can be subjected to or can include modifications from any know lens processing including, but not limited to, tinting (e.g., including adding a photochromic), anti-reflection coating, anti-soiling coating, scratch resistance hard coating, ultra-violet coating, selective filtering of high energy light, drilling, edging, surfacing, polishing and free forming or direct digital surfacing.

The multifocal lens 100 can be a static lens. For example, the multifocal lens 100 can be a bifocal, trifocal or multifocal lens, a lens having a progressive addition surface, a lens having a diffractive surface, a lens having a progressive region of optical power or any combination thereof. Overall, the multifocal lens can be any lens having one or more regions of constant or fixed optical power, including different optical powers.

The multifocal lens 100 can be a dynamic lens. For example, the multifocal lens 100 can be an electro-active lens, a fluid lens, a mechanically focusing lens, or a membrane spectacle lens. Overall, the multifocal lens 100 can be any lens capable of having its external convex and/or concave curvature altered mechanically or manually, or its optical power or depth of focus changed or altered in a dynamic manner.

The insert 104 can comprise one or more diffractive regions. The diffractive region can be a static (e.g., non-dynamic or non-electro-active) or a dynamic electro-active diffractive region, or any combination thereof. The diffractive region can provide constant optical power, a progression of optical power or a combination thereof. The diffractive region of the insert 104 can provide discrete changes in optical power without the abrupt sag or slope discontinuities of a conventional refractive surface. As an electro-active diffractive region, the diffractive region can provide an alterable optical power. The diffractive region of the insert 104 can also be cropped or blended. Cropping can reduce the size of the diffractive region (e.g., by removing or not forming a portion of a concentric ring of a typical diffractive structure) while maintaining a desired shape and effective optical power. Overall, a diffractive region of the insert 104 can be or can exhibit any of the characteristics (e.g., variation in shape, size, orientation, positioning, blending, cropping, optical power provided, fabrication, blending efficiency, etc.) of any of the diffractive regions described in U.S. patent application Ser. No. 12/166,526, filed on Jul. 2, 2008, which is hereby incorporated by reference in its entirety.

The insert 104 can be fabricated as an optical film, an optical wafer, a rigid optic or a lens blank. The diffractive region of the insert 104 can be fabricated, for example, to have a thickness ranging from 1 µm to 100 µm. As an optical film, the insert 104 can have a thickness, for example, ranging from 50 µm to 500 µm. As a rigid optic lens wafer, or lens blank, the insert 104 can be fabricated, for example, to have a thickness of 0.1 mm to 7 mm.

Surrounding the diffractive region of the insert 104 can be a refractive region. The refractive region of the insert 104 can be of any optical power, including plano. By including a refractive and diffractive region of differing optical powers, the insert 104 of the present invention can be considered to be a refractive-diffractive multifocal insert.

The host lens material 102 can have different indices of refraction on the front and back surfaces of the multifocal lens 100. That is, the front layer of the host lens material 102 can comprise a material that is different from a material comprising the back layer of the host lens material 102. The front and/or back surfaces of the multifocal lens 100 can comprise refractive optics, elements or regions. For example, a far distance zone of the multifocal lens 100 located in an upper region of the multifocal lens 100 can provide plano optical power while one or more near distance zones located in a lower region of the multifocal lens 100 can provide positive optical power. The radii of curvature of the front and back surfaces of the multifocal lens 100 can be predetermined so as to generate known amounts of refractive optical power. The front, back or internal surfaces of the multifocal lens 100 can comprise progressive surfaces or regions. The progressive regions can be added by grinding and polishing, by free-forming, or by molding or casting.

The multifocal lens 100 can comprise one or more index matching layers 106 (which can also be considered index mediating, mitigating or bridging layers as may be used in the discussion below). The index matching layers 106 can be used to reduce reflection losses between the host lens material 102 and the insert 104. The index matching layer 106 can have, for example, a refractive index that is substantially equal to the arithmetic mean of the refractive indices of the host lens material 102 and the insert 104. Additionally, the index matching layer 106 can be used as a primer layer to promote adhesion between the host lens material 102 and the insert 104 and while reducing the visibility of a diffractive region positioned on the insert 104. Index matching layers/mediating layers 106 may or may not be used depending upon the difference between the indices of refraction between the host lens material 102 and the insert 104. Additional details on the design and use of index matching layers is described in U.S. patent application Ser. No. 12/238,932, filed on Sep. 26, 2008, which is hereby incorporated by reference.

The multifocal lens 100 can provide multiple vision zones that are wider and exhibit less distortion than traditional multifocal lenses including progressive addition lenses. Further, the multifocal lens 100 can provide the multiple vision zones with a significantly reduced or invisible break between adjacent vision zones as compared to traditional bifocal or trifocal lenses. A diffractive region of the insert 104 can provide one or more constant, progressive or variable optical powers that can be combined with the one or more constant, progressive or variable optical powers provided by the surfaces of the host lens material 102. The one or more constant, progressive or variable optical powers contributed in part by the surfaces of the host lens material 102 can be provided by the front and/or back surfaces or layers of the host lens material 102.

The optical powers provided by a diffractive region of the insert 104 can be combined with the optical powers of the host lens material 102 as described in U.S. patent application Ser. No. 12/059,908, filed on Mar. 31, 2008, U.S. patent application Ser. No. 11/964,030, filed on Dec. 25, 2007, and U.S. patent application Ser. No. 12/238,932, filed on Sep. 26, 2008 each of which is hereby incorporated by reference in their entirety. In general, the diffractive region of the insert 104 can be fabricated to provide any desired optical power including, but not limited to, any optical power within a range of +0.12 D to +3.00 D. Further, the diffractive region of the insert 104 can be positioned to be in optical communication with the optical powers provided by the host lens material 102 to provide any desired near distance add power with any corresponding desired intermediate distance corrective prescription.

The multifocal lens 100 can comprise a far distance viewing region that can comprise refractive optics (e.g., refractive regions of the host lens material 102 in combination with refractive regions of the insert 104). The multifocal lens 100 can comprise one or more viewing regions (e.g., far intermediate, intermediate and/or near viewing regions) that can comprise refractive optics, diffractive optics or a combination thereof (e.g., refractive regions of the host lens material 102 in combination with diffractive regions of the insert 104). The multifocal lens 100 can therefore use the combination of refractive and diffractive optics positioned on one or more surfaces or layers to provide multiple vision zones of varying optical power. As such, the multifocal lens 100 can be considered to be a refractive-diffractive multifocal lens.

By locating and distributing the desired refractive curves or diffractive structures on multiple surfaces, layers or regions of the multifocal lens 100, each of which are in a desired location for providing an appropriate and desired optical alignment with respect to one another, enables the multifocal lens 100 to provide multiple vision zones that are wider than traditional multifocal or progressive lenses as described in the related patent applications mentioned above.

The diffractive region of the insert 104 may or may not include an optical power discontinuity. The diffractive region of the insert 104 may not be visible to an observer of the multifocal lens 100. Specifically, because the diffractive structures of the diffractive region of the insert 104 can be fabricated to have minimal heights, the diffractive region of the insert 104 may be nearly invisible to an observer—particularly when covered by another layer (i.e., the front layer of the host lens material 102). Further, any discontinuity introduced by the diffractive region's optical power can introduce little or no prismatic optical power jump. An image break introduced by such a discontinuity can be that of a prismatic image break, a magnification image break, a perceived clear/blur image break, or any combination thereof. A change in optical power of approximately 0.08 diopters (D) or larger may be considered as introducing a discontinuity that causes such an image break. As described in the incorporated and related patent applications, any discontinuity can be located in a region traversed by a wearer's line of vision between a near to far distance region or can be located in the periphery of the diffractive region.

Overall, the multifocal lens 100 can comprise any number of discontinuities (including no discontinuities). One or more discontinuities can be introduced by a single diffractive region or by multiple diffractive regions.

As previously described, the host lens material 102 and the insert 104 can be fabricated from any material having different indices of refraction. The materials used to form the host lens material 102 can be any material described in U.S. application Ser. No. 12/059,908, filed on Mar. 31, 2008 or U.S. application Ser. No. 11/964,030, filed on Dec. 25, 2007, including those listed below in Table 1.

TABLE I

| MATERIAL | INDEX OF REFRACTION | ABBE VALUE | SUPPLIER |
|---|---|---|---|
| CR39 | 1.498 | 55 | PPG |
| Nouryset 200 | 1.498 | 55 | Great Lakes |
| Rav-7 | 1.50 | 58 | Evergreen/Great Lakes Co. |
| Trivex 1.53 | 1.53 | 44 | PPG |
| Trivex 1.60 | 1.60 | 42 | PPG |
| MR-8 | 1.597 | 41 | Mitsui |
| MR-7 | 1.665 | 31 | Mitsui |
| MR-10 | 1.668 | 31 | Mitsui |
| MR-20 | 1.594 | 43 | Mitsui |
| Brite-5 | 1.548 | 38 | Doosan Corp. (Korea) |
| Brite-60 | 1.60 | 35 | Doosan Corp. (Korea) |
| Brite-Super | 1.553 | 42 | Doosan Corp. (Korea) |
| TS216 | 1.59 | 32 | Tokuyama |
| Polycarbonate | 1.598 | 31 | GE |
| UDEL P-1700 NT-06 | 1.634 | 23.3 | Solvay |
| Radel A-300 NT | 1.653 | 22 | Solvay |
| Radel R-5000 NT | 1.675 | 18.7 | Solvay |
| Eyry | 1.70 | 36 | Hoya |
| Essilor High Index | 1.74 | 33 | Essilor |

The difference in the refractive indices between the host lens material 102 and the insert 104 can be any value such as, but not limited to, greater than 0.01. One skilled in the relevant art(s) will appreciate how a diffractive region of the insert 104 can be designed to account for being placed between materials having a different refractive index (e.g., an index of refraction different from air) and provide a desired optical power. Further, the index of refractive of the host material 102 can be larger than the index of refraction of the insert 104. This can result in a thinner lens as any curves of the host lens material 102 can be made to be flatter than if the index of refraction of the host lens material 104 was smaller.

The insert 104 can be inserted or embedded into the host lens material 102 (with or without one or more index mediating and/or matching layers 106) by any known lens fabrication technique or process. For example, the insert 104 can be molded within the host lens material 102 when the host lens material 102 is first fabricated and/or cast from liquid resin as a lens blank. The insert 104 can also be embedded between two lens wafers that form the front and back components of the host lens material 102. The two lens wafers can then be adhesively bonded together so as to form the multifocal lens 100 as a lens blank. Additional detail on methods of fabricating the multifocal lens 100 is provided in the previously mentioned related patent applications.

A diffractive region of the insert 104 can be embedded as an uncured or semi-cured resin. The diffractive region can also be formed or inserted into the multifocal lens 100 by injection molding, stamping, embossing or thermal forming. The diffractive region can also be fabricated by diamond turning a mold or mold master (for use in subsequent mold replications) that is then used to cast a desired diffractive optic. The insert 104 can be, for example, a material such as polysulfone, polyimide, polyetherimide or polycarbonate.

The insert 104 can alternatively comprise a layer of a photo-sensitive material with uniform thickness (i.e., not initially comprising surface relief diffractive structures). The refractive index of the photo-sensitive material can permanently and irreversibly change to a predetermined value when exposed to optical radiation. The photo-sensitive material may be exposed to radiation in a pattern predetermined to form a desired diffractive optical power region. For example, a diffractive phase profile may be "written" on the photo-sensitive material by means of exposure through an optical mask or a scanning laser source. The optical radiation can be, for example, within the ultra-violet or visible wavelength bands, although other wavelengths can be used.

Figure 2:
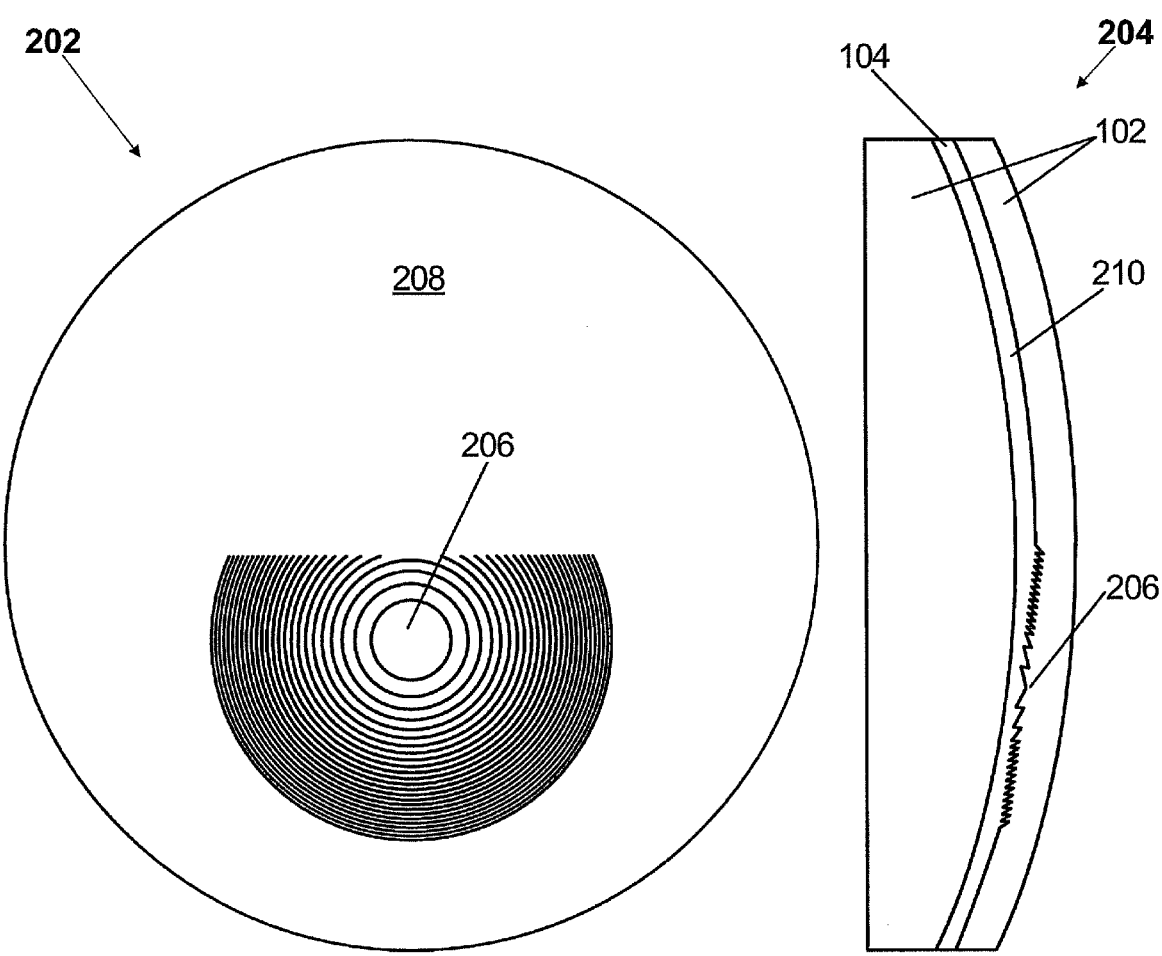
FIG. 2 illustrates a front view and a corresponding cross-sectional view of a first multifocal lens of the present invention.

FIG. 2 illustrates a front view 202 and a corresponding cross-sectional view 204 of a multifocal lens of the present invention. The multifocal lens depicted in FIG. 2 can be a lens blank. The multifocal lens has a refractive region 208 and a diffractive region 206. The refractive region 208 can provide desired optical power in an upper region and lower region of the multifocal lens. The refractive region 208 can be of any desired optical power. As an example, the entire refractive region 208 can be of piano optical power. The provided optical power can vary within the refractive region 208 as will be understood by one skilled in the pertinent art(s).

The diffractive region 206 is shown to be cropped. In particular, the diffractive region 206 is shaped as a portion of a circle but is not so limited. That is, the diffractive region 206 can comprise any shape as previously mentioned. For example, the diffractive region can be a semi-circle. Additionally, the diameter of the diffractive region 206 can be any value including, but not limited to, 40 mm. The diffractive region 206 can provide a constant optical power. As an example, the diffractive region 206 can provide +0.75 Diopters (D) of optical power. A discontinuity may result due to a step-up or step-down in optical power between the refractive region 208 and the diffractive region 206.

As shown in the side view 204, the multifocal lens comprises the host lens material 102 and the insert 104. As an example, the insert 104 can be approximately 100 µm thick and can have an index of refraction of 1.60. The insert 104 can comprise the diffractive region 206 and a refraction region 210. The refractive region 210 can provide any optical power including plano optical power. As such, the insert 104 can be considered to be a thin refractive-diffractive multifocal optic.

The host lens material 102 that surrounds the insert 104 can be a refractive single vision lens. The host lens material can be finished on the front convex curvature and can be unfinished on the back side of the semi-finished lens blank. The host lens material can have any index of refraction, including, but not limited to, a refractive index within the range of 1.30 to 2.00.

The optical power of an upper region of the multifocal lens (e.g., the optical power of the overall refractive region 208) can be provided by the refractive region 210 of the insert 104 and the refractive regions of the host lens material 102. The optical power of a lower region of the multifocal lens can be provided by the diffractive region 206 of the insert 104. Once the back unfinished surface is finished by surfacing or free forming, the multifocal lens depicted in FIG. 2 can be a bifocal lens having an add power of +0.75 D. In general, the total add power of the multifocal lens depicted in FIG. 2 can be any add power as contributed by the diffractive structure.

Figure 3:
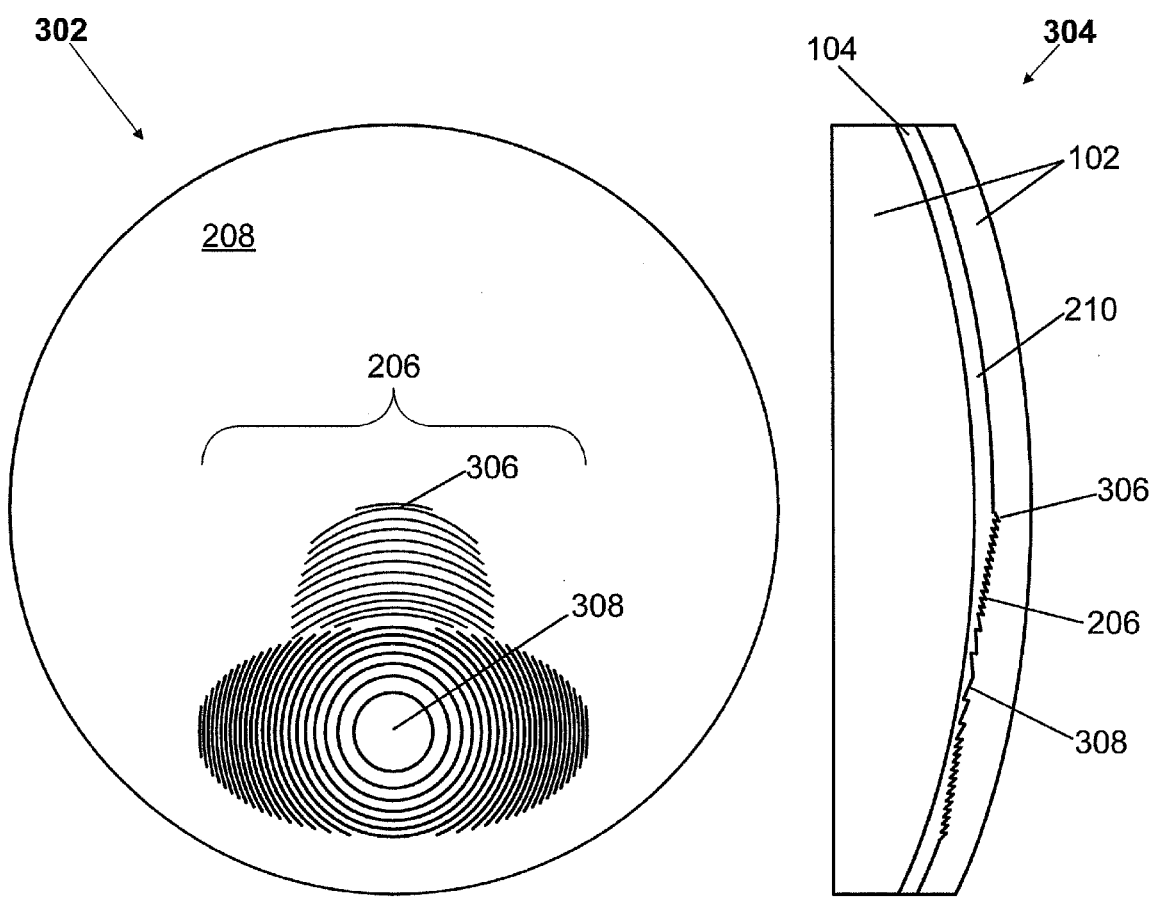
FIG. 3 illustrates a front view and a corresponding cross-sectional view of a second multifocal lens of the present invention.

FIG. 3 illustrates a front view 302 and a corresponding cross-sectional view 304 of a multifocal lens of the present invention. The multifocal lens depicted in FIG. 3 can be a lens blank. The diffractive region 206 can be a progressive diffractive region. Specifically, a top 306 of the diffractive region 206 can begin or start with a minimum optical power that can increase to a maximum optical power at a maximum optical power region 308. The diffractive region 206 can be formed by cropping.

As an example only, the minimum optical power can be plano optical power and the maximum optical power can be +1.75 D. Alternatively, the minimum optical power can be +0.25 D optical power and the maximum optical power can be +1.00 D. A discontinuity may or may not result due to a step-up or step-down in optical power between the refractive region 208 and the diffractive region 206. For example, if the diffractive region 206 begins with an optical power that is substantially the same as the optical power provided by the adjacent portion of the refractive region 208, then no discontinuity may result. Alternatively, if the diffractive region 206 begins with an optical power that is different than the optical power provided by the adjacent portion of the refractive region 208, then a discontinuity may result.

As shown in the side view 304, the multifocal lens comprises the host lens material 102 and the insert 104. As an example, the insert 104 can range from approximately 0.1 mm to 1 mm thick and can have an index of refraction of 1.60.

The host lens material 102 that surrounds the insert 104 can be a refractive single vision lens. The host lens material can be finished on the front convex curvature and can be unfinished on the back side of the semi-finished lens blank. The host lens material can have an index of refraction, for example, of 1.49. The optical power of a lower region of the multifocal lens (e.g., one or more near distance vision zones) can be provided by the progressive diffractive region 206 of the insert 104.

Once the back unfinished surface is finished by surfacing or free forming, the multifocal lens depicted in FIG. 3 can provide multiple vision zones with multiple or varying optical powers provided by the progressive diffractive structure 206. When the multifocal lens is finished, and the progressive structure begins with a power that is substantially the same as a power provided in a distance region (e.g., a top 306 of the diffractive region 206 and the refractive region 210 are both plano), then the multifocal lens can be considered a multifocal progressive addition lens. Alternatively, when the multifocal lens is finished, and the progressive structure begins with a power that varies from a power provided in a distance region (e.g., a top 306 of the diffractive region 206 and the refractive region 210 are not both plano), then the multifocal lens may be considered to be different from a traditional progressive addition lens yet still provide a progression of optical powers.

The multifocal lens depicted in FIG. 3 can have its front surface and or back surface free formed or digital direct surfaced to provide an additional incremental add power region. Further, this additional incremental add power can comprise a spherical add power or a progressive optical power and can be in optical communication with the diffractive structure 206.

Figure 4:
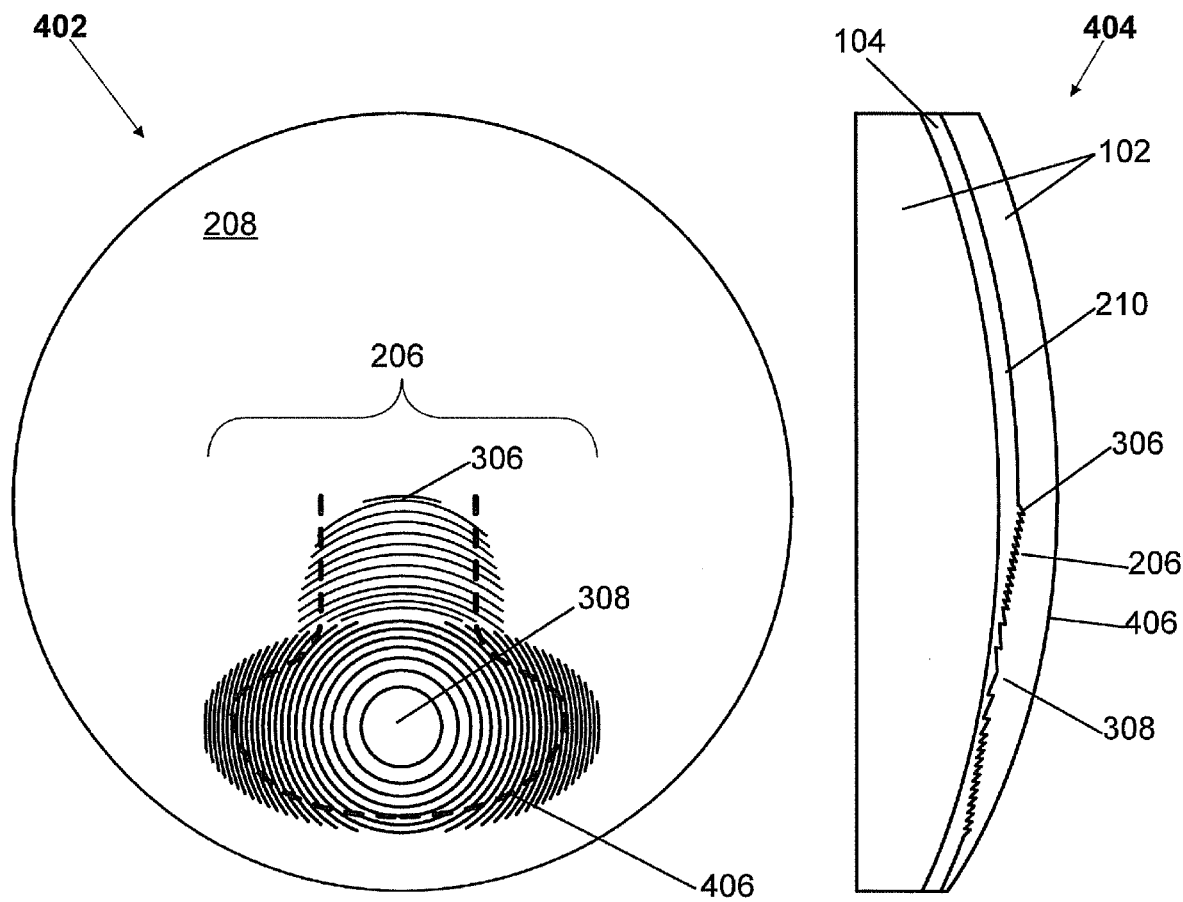
FIG. 4 illustrates a front view and a corresponding cross-sectional view of a third multifocal lens of the present invention.

FIG. 4 illustrates a front view 402 and a corresponding cross-sectional view 404 of a multifocal lens of the present invention. The multifocal lens depicted in FIG. 4 can be a lens blank. The diffractive region 206 can be a progressive diffractive region. Specifically, a top 306 of the diffractive region 206 can begin or start with a minimum optical power that can increase to a maximum optical power at a maximum optical power region 308. The diffractive region 206 can be formed by cropping.

As an example only, the minimum optical power can be +0.01 D (or, e.g., +0.25 D) and the maximum optical power can be +1.00 D. A discontinuity may result due to a step-up in optical power between the refractive region 208 and the diffractive region 206 (e.g., if the diffractive structure 206 contributes to an optical power that is 0.08 D or greater). For example, the refractive region 208 may be of plano optical power such that a step-up in optical power results between the refractive region 208 and the diffractive region 206.

The multifocal lens can further comprise a progressive optical power region 406. The progressive optical power region 406 can be a refractive progressive optical power region. The progressive optical power region 206 can be located on the front or back surface of the multifocal lens. For example, the progressive optical power region 206 can be added by molding or by free-forming. The refractive progressive optical power region 206 can be positioned anywhere on a surface of the multifocal lens so that any portion can overlap any portion of the diffractive structure 206. The progressive optical power region 406, as an example, can begin with plano optical power and can increase to +1.00 D of optical power. As such, the progressive optical power region 406 can provide a first incremental add power and the diffractive structure 206 can provide a second incremental add power. Together, when aligned and in proper optical communication with one another, the first and second incremental add powers can provide a total add power of +2.00 D.

As shown in the side view 304, the multifocal lens comprises the host lens material 102 and the insert 104. As an example, the insert 104 can range from approximately 0.1 mm to 1 mm thick and can have an index of refraction of 1.60.

The host lens material 102 that surrounds the insert 104 can be a refractive multifocal lens. The host lens material can be finished on the front convex curvature and can be unfinished on the back side of the semi-finished lens blank. The host lens material can have an index of refraction, for example, of 1.49. The optical power of a lower region of the multifocal lens can be provided by the progressive diffractive region 206 of the insert 104 in optical communication with the progressive optical power region 406 of the host lens material. Additionally, one or more vision zones in the lower region of the multifocal lens can be solely provided by the diffractive structure 206.

Once the back unfinished surface is finished by surfacing or free forming, the multifocal lens depicted in FIG. 4 can provide multiple vision zones with multiple or varying optical powers that can be provided by the progressive diffractive structure 206 alone or in combination with the progressive optical power region 406.

In general, according to an aspect of the invention, a diffractive region of an insert of the present invention can provide a first incremental add power and a refractive region of a surface of bulk lens material can provide a second incremental add power. Together, the first and second incremental add powers can provide a total desired add power for a multifocal lens of the present invention. This can be accomplished by ensuring that the diffractive region of the insert (at least a portion thereof) is in optical communication with the refractive region (or regions) of the bulk lens material. Further, the diffractive region of the insert and the refractive region (or regions) of the bulk lens material can be oriented or aligned to form multiple vision zones having various optical powers as will be appreciated by one skilled in the pertinent art(s).

According to an aspect of the present invention, the diffractive region of an insert of the present invention can provide 20% to 100% of the total desired add power of an overall lens. In many designs, it may be desired for the diffractive region to provide 30% or approximately 33% of a total desired add power of a lens. Given an add power contribution provided by the diffractive region, an add power of the refraction region(s) of the bulk lens material can be determined. Further, in many designs, the add power of the diffractive region can vary from +0.125 D to +3.00 D in steps of 0.125 D.

Figure 5:
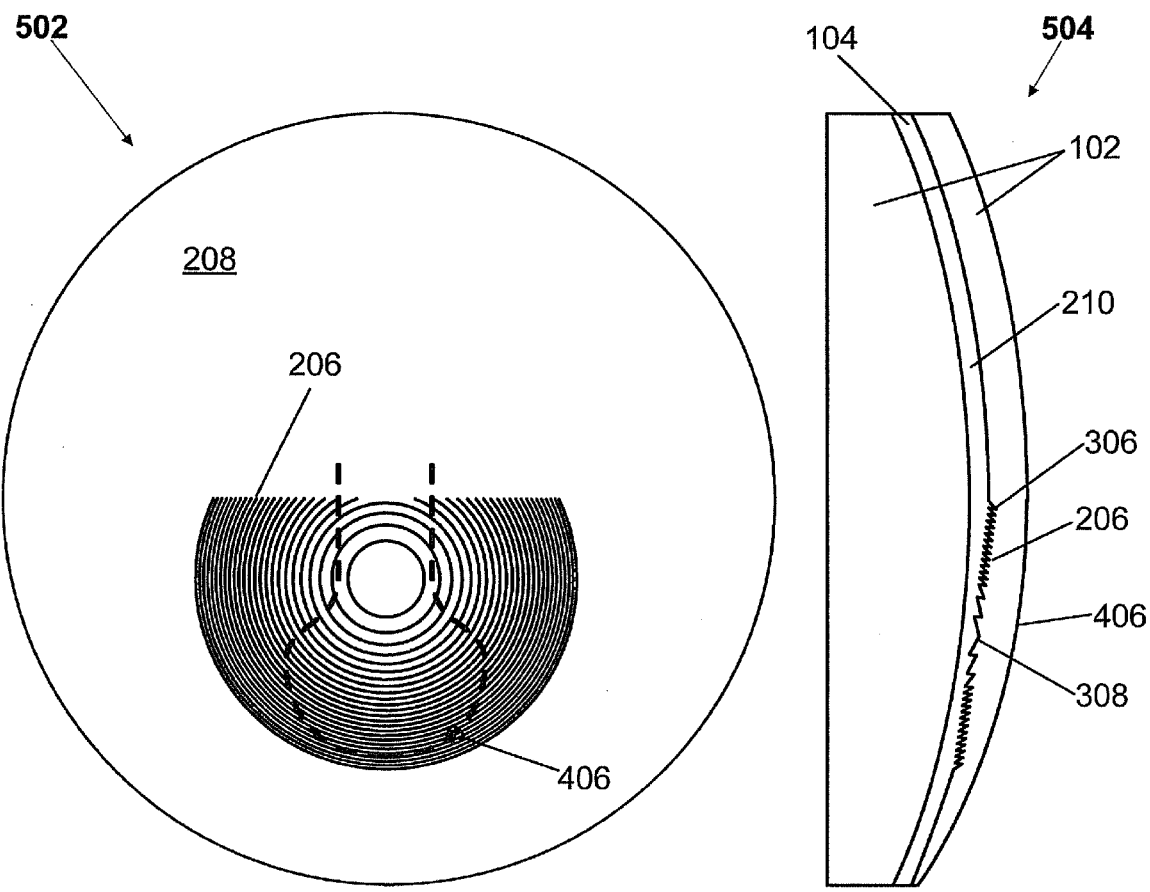
FIG. 5 illustrates a front view and a corresponding cross-sectional view of a fourth multifocal lens of the present invention.

FIG. 5 illustrates a front view 502 and a corresponding cross-sectional view 504 of a multifocal lens of the present invention. The multifocal lens depicted in FIG. 5 can be a lens blank. The diffractive region 206 can provide a constant optical power. The diffractive region 206 can be formed by cropping. As an example, the diffractive region 206 can provide +0.75 D of optical power. A discontinuity may result due to a step-up in optical power between the refractive region 208 and the diffractive region 206. For example, the refractive region 208 may be of any optical power, including plano optical power, such that a step-up in optical power results between the refractive region 208 and the diffractive region 206.

The multifocal lens can further comprise a progressive optical power region 406. The progressive optical power region 406 can be positioned anywhere on the multifocal lens and be positioned to be in optical communication with the diffractive region 206. The progressive optical power region 406 can be a refractive progressive optical power region. The progressive optical power region 206 can be located on the front or back surface of the multifocal lens. As an example, the progressive optical power region 406 can begin with piano optical power and can increase to +1.25 D of optical power. As such, the progressive optical power region 406 can provide a first incremental add power and the diffractive structure 206 can provide a second incremental add power. Together, the first and second incremental add powers can provided a total add power of +2.00 D.

As shown in the side view 504, the multifocal lens comprises the host lens material 102 and the insert 104. As an example, the insert 104 can range from approximately 0.1 mm to 1 mm thick and can have an index of refraction of 1.60.

The host lens material 102 that surrounds the insert 104 can be a refractive multifocal lens. The host lens material can be finished on the front convex curvature and unfinished on the back side of the semi-finished lens blank. The host lens material can have an index of refraction, for example, of 1.49. The optical power of a lower region of the multifocal lens can be provided by the progressive diffractive region 206 of the insert 104 in optical communication with the progressive optical power region 406 of the host lens material. Additionally, one or more vision zones or regions can be located at or preferably below a fitting point of the lens and can be solely provided by the diffractive structure 206. The fitting point of the lens can be a point on the lens that will align with the center of a wearer's pupil.

Once the back unfinished surface is finished by surfacing or free forming, the multifocal lens depicted in FIG. 5 can provide multiple vision zones with multiple or varying optical powers provided by the progressive diffractive structure 206 alone or in combination with the progressive optical power region 406. The progressive optical power region 406 can begin above or below the diffractive region 206. Based on the positioning of the progressive optical power region 406 and the optical powers of the progressive optical power region 406 and the diffractive region 206, a discontinuity may or may not result between a refractive distance region 208 of the lens and a near vision region of the lens.

In general, a refractive-diffractive multifocal insert of the present invention can be combined with one or more other layers, surfaces or optics as described in more detail in any of the previously mentioned related patent applications that have been incorporated by reference.

Figure 7:
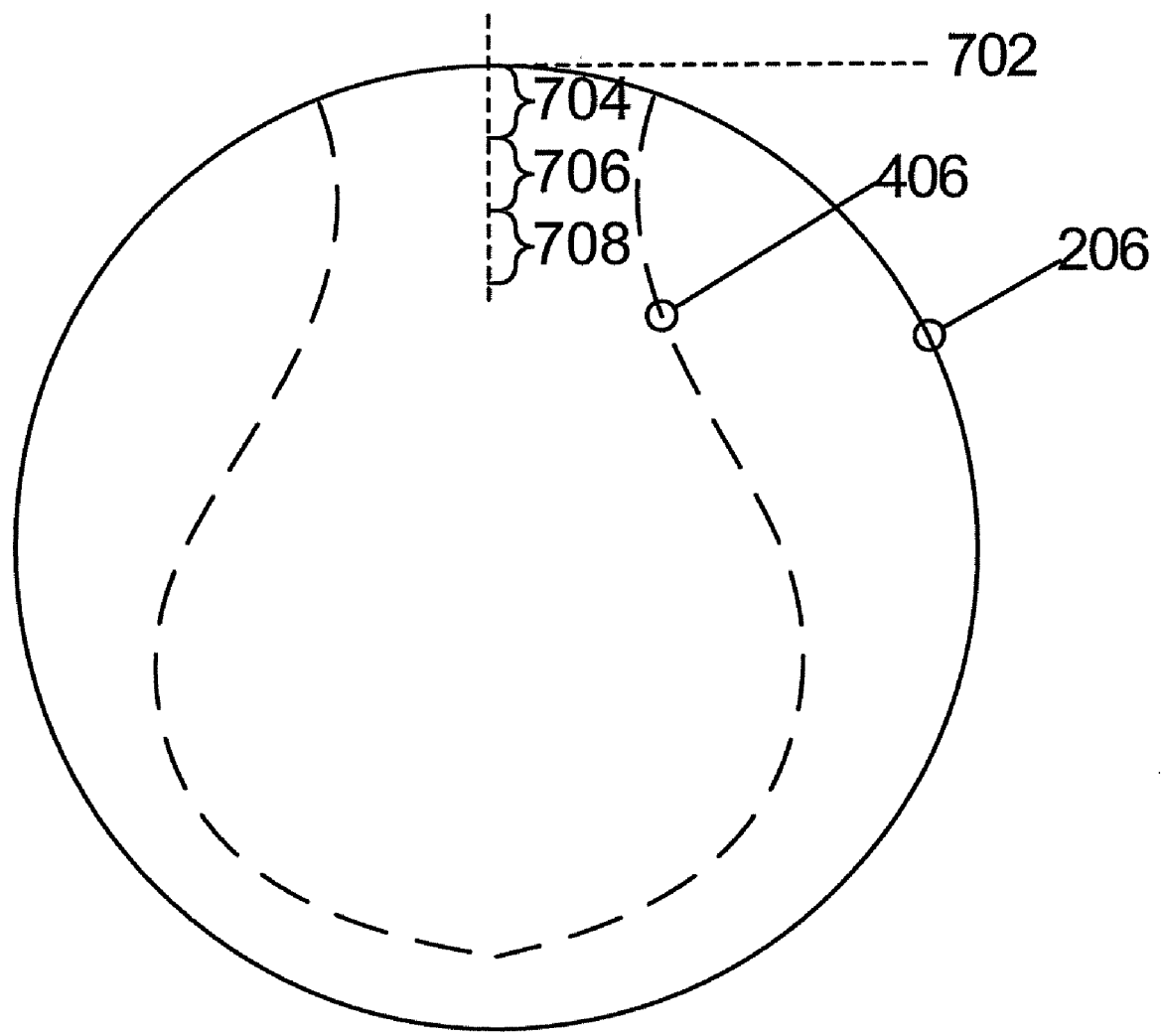
FIG. 7 illustrates a close-up view of a possible alignment of a diffractive region and a progressive optical power region in accordance with an aspect of the present invention

FIG. 7 illustrates a close-up view of a possible alignment and positioning of the diffractive region 206 and the progressive optical power region 406 in accordance with an aspect of the present invention. Specifically, FIG. 7 depicts a possible overlap between the upper portions of the diffractive region 206 and the progressive optical power region 406. The diffractive structures of the diffractive region 206 are not shown in FIG. 7 for clarity only (instead, only a boundary of the diffractive region 206 is depicted).

As shown in FIG. 7, a top 702 of the progressive optical power region 406 is aligned with the top of the diffractive region 206. A first distance 704 can correspond to a first change in the optical power provided by the progressive optical power region 406. Specifically, the first change can be from a beginning optical power value (e.g., zero D) to a first optical power value. A second distance 706 can correspond to a second change in the optical power provided by the progressive optical power region 406. Specifically, the second change can be from the first optical power value to a second optical power value. A third distance 708 can correspond to a third change in the optical power provided by the progressive optical power region 406. Specifically, the change can be from a second optical power value to a third optical power. Accordingly, as shown in FIG. 7, the progressive optical power region 406 can change from a starting optical power at the top 702 of the progressive optical power region 406 to a third optical power value by the end of a third distance 708.

The length of the first, second and third distances 704, 706 and 708, as well as the corresponding first, second and third optical power values can be adjusted and modified to accommodate any ramp-up in optical power within the progressive optical power region 406. For a sharp ramp up in optical power, the distances 704, 706 and 708 can be designed to be short and/or the power changes within each zone can be high. For a slow ramp up in optical power, the distances 704, 706 and 708 can be designed to be extended and/or the power changes within each zone can be low. In general, the distances 704, 706 and 708 and corresponding power change values can be designed to be any value.

As an example, each of the distances 704, 706 and 708 can be 1 mm in length and the changes in optical power can be +0.03 D in the first distance 704, +0.03 D in the second distance 706, and +0.04 D in the third distance 708. Under this scenario, the first optical power value is +0.03 D, the second optical power value is +0.06 D, and the third optical power value is +0.1 D.

As previously mentioned, the shape of the diffractive region 206 is not limited to the shape depicted in FIG. 7. That is, the diffractive region 206 can be any shape resulting from cropping including a portion of a circle. Any shaped diffractive region 206 can have a top that is aligned with a top or start 702 of the progressive optical power region 406 as shown in FIG. 7.

A multifocal lens comprising an embedded or buried refractive-diffractive multifocal insert optic of the present invention can be fabricated according to any of the methods described in the related and incorporated patent applications. As an example, the refractive-diffractive multifocal insert optic of the present invention can comprise a perform. One or more external refractive layers can be added to the perform by casting and curing an optical grade resin on top of the perform.

Figure 6:
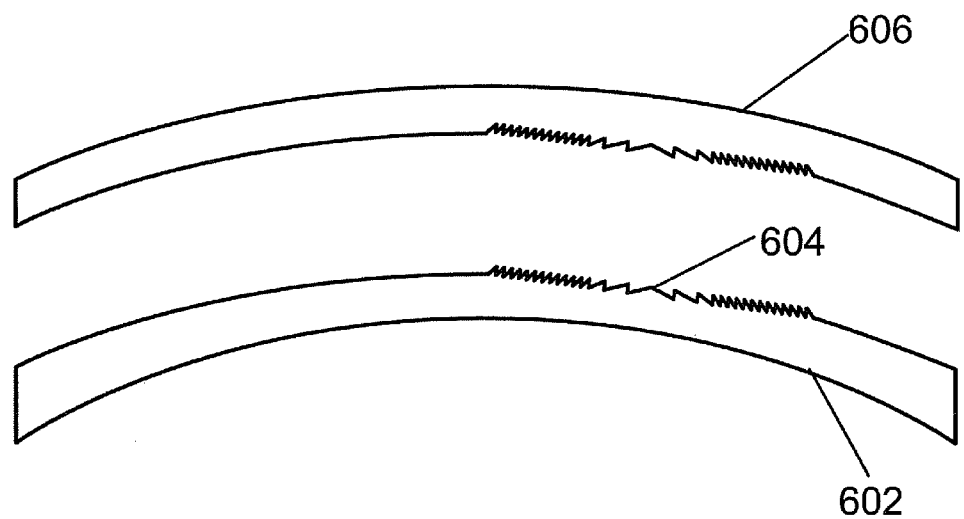
FIG. 6 illustrates a process for fabricating a multifocal lens of the present invention.
Figure 6:
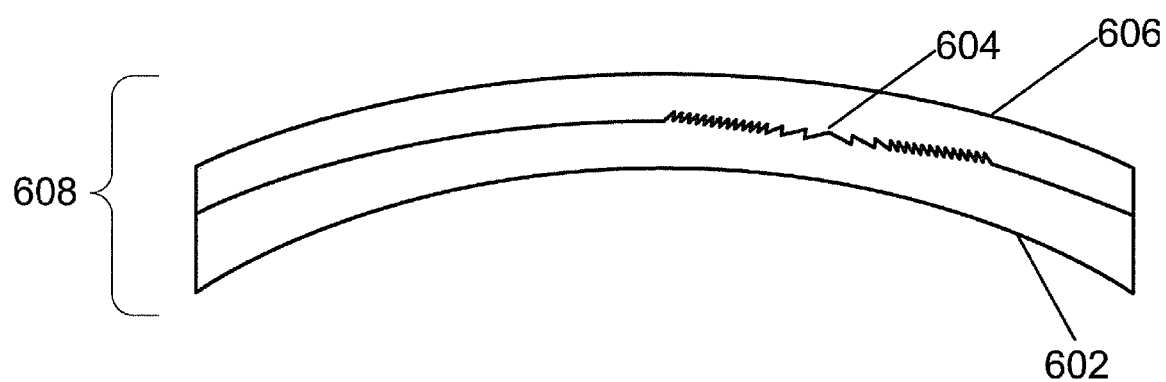

An example of this process is shown in FIG. 6. FIG. 6 shows a preform 602. The perform 602 can comprise a refractive-diffractive multifocal optic of the present invention. The perform 602 comprises a refractive region and a diffractive region 604. The diffractive region 604 can be cropped. A resin layer 606 can be cast on top of the perform 602 to form a multifocal lens 608 of the present invention. The resin layer 606 can form a front surface of the multifocal lens. The resin layer 606 can be later finished to include a progressive region. The resin layer 606 can be cast and cured on perform 602. The resin layer 606 or layer 602 can be photochromatic, polarized, tinted, include a selective high energy wavelength filter, or can form a portion of an electro-active element. If layer 602 is photochromatic then layer 606 can be selected of a material so as to block as little ultraviolet (UV) light as possible.

In the description above, it will be appreciate by one skilled in the pertinent art(s) that the diffractive structures employed above can be replaced with refractive surface relief Fresnel optical power regions. Surface relief Fresnel optical power regions can comprise a series of optical zones that represent the shape of a conventional refractive surface relief optical power region but modulated over a pre-determined thickness. Such surface relief Fresnel optical power regions can be superimposed on a substrate having a known refractive index. As is the case for refractive optics, Snell's law applies and can be used for designing the surface relief Fresnel optical power regions. For a given design of a surface relief Fresnel optical power region, the angle at which the light rays will be bent will be determined by the refractive index values of the materials forming the surface relief Fresnel optical power regions and the incident angle of said light rays.

CONCLUSION

While various embodiments of the present invention have been described above, it should be understood that they have been presented by way of example and not limitation. As such, all optical powers, add powers, incremental add powers, optical power ranges, refractive indices, refractive index ranges, thicknesses, thickness ranges, distances from the fitting point of the lens, and diameter measurements that have been provided are examples only and are not intended to be limiting. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A lens, comprising:
   an insert having an index of refraction, the insert comprising a refractive region and a diffractive region;
   a host lens having an index of refraction, the host lens comprising a progressive optical power region, wherein the diffractive region and the progressive optical power region are in optical communication and wherein the insert is embedded within the host lens; and
   wherein the diffractive region provides a first incremental add power and the progressive optical power region provides a second incremental add power, the first and second incremental add powers collectively providing a full near add power of the lens, and wherein the first incremental add power is approximately one-third of the full near add power of the lens.

2. The lens of claim 1, wherein the insert has a thickness ranging from 0.1 mm to 7 mm.

3. The lens of claim 1, wherein the insert has a thickness ranging from 50 μm to 500 μm.

4. The lens of claim 1, wherein the index of refraction of the host lens is larger than the index of refraction of the insert.

5. The lens of claim 1, further comprising an index matching layer having an index of refraction which matches the index of refraction of at least one of the insert and the host lens.

6. The lens of claim 5, wherein the index of refraction of the index matching layer is substantially equal to the arithmetic mean of the refractive indices of the insert and the host lens.

7. The lens of claim 1, wherein the diffractive region provides a substantially constant optical power.

8. The lens of claim 1, wherein the diffractive region provides a progression of optical power.

9. The lens of claim 1, wherein the diffractive region is cropped.

10. The lens of claim 1, wherein the second incremental add power is greater than the first incremental add power.

11. A lens, comprising:
    an insert having an index of refraction, the insert comprising a refractive region and a diffractive region; and
    a host lens having an index of refraction, the host lens comprising a progressive optical power region, wherein the diffractive region and the progressive optical power region are in optical communication and wherein the insert is embedded within the host lens, and
    wherein the progressive optical power region begins at a top of the diffractive region and reaches approximately +0.1 D at approximately 3 mm below the top of the diffractive region.

12. The lens of claim 11, wherein the insert has a thickness ranging from 0.1 mm to 7 mm.

13. The lens of claim 11, wherein the insert has a thickness ranging from 50 μm to 500 μm.

14. The lens of claim 11, wherein the index of refraction of the host lens is larger than the index of refraction of the insert.

15. The lens of claim 11, further comprising an index matching layer having an index of refraction which matches the index of refraction of at least one of the insert and the host lens.

16. The lens of claim 15, wherein the index of refraction of the index matching layer is substantially equal to the arithmetic mean of the refractive indices of the insert and the host lens.

17. The lens of claim 11, wherein the diffractive region provides a substantially constant optical power.

18. The lens of claim 11, wherein the diffractive region provides a progression of optical power.

19. The lens of claim 11, wherein the diffractive region is cropped.

20. The lens of claim 11, wherein the diffractive region provides a first incremental add power and the progressive optical power region provides a second incremental add power, the first and second incremental add powers collectively providing a full near add power of the lens, and wherein the first incremental add power is approximately one-third of the full near add power of the lens, and further wherein the second incremental add power is greater than the first incremental add power.

* * * * *